(12) United States Patent
Fahland et al.

(10) Patent No.: US 12,427,994 B2
(45) Date of Patent: Sep. 30, 2025

(54) VEHICLE SYSTEMS AND METHODS FOR DYNAMIC DRIVER TUNING

(71) Applicant: GM GLOBAL TECHNOLOGY OPERATIONS LLC, Detroit, MI (US)

(72) Inventors: Jason D. Fahland, Fenton, MI (US); Saurabh Kapoor, Windsor (CA); Kenneth William Lampert, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 18/454,268

(22) Filed: Aug. 23, 2023

(65) Prior Publication Data
US 2025/0065885 A1    Feb. 27, 2025

(51) Int. Cl.
*B60W 40/09* (2012.01)
*B60W 50/00* (2006.01)
*B60W 50/08* (2020.01)
*B60W 50/10* (2012.01)

(52) U.S. Cl.
CPC ............ *B60W 40/09* (2013.01); *B60W 50/10* (2013.01); *B60W 2554/4045* (2020.02)

(58) Field of Classification Search
None
See application file for complete search history.

(56) References Cited

U.S. PATENT DOCUMENTS

2022/0063631 A1*  3/2022  Hassani ............... B60W 40/08
2022/0097728 A1*  3/2022  Lin ....................... G06N 20/00

* cited by examiner

*Primary Examiner* — Jason Holloway
*Assistant Examiner* — Atticus A Cameron
(74) *Attorney, Agent, or Firm* — Ingrassia Fisher & Lorenz, LLP | IF&L

(57) ABSTRACT

Vehicles and related systems and methods are provided for assisting operation of a vehicle by enabling dynamic tuning of vehicle responsiveness. One method involves obtaining an auxiliary driver input indicative of an auxiliary driver command to influence responsiveness of the vehicle from an auxiliary human-machine interface device different from a primary human-machine interface device for receiving primary driver input indicative of a driver command to influence a trajectory of the vehicle. In response to the auxiliary driver input, a relationship between a vehicle state command and the driver input is adjusted based on the auxiliary driver input, wherein an actuator control system operates one or more actuators of the vehicle in accordance with the adjusted vehicle state command to influence the trajectory of the vehicle responsive to the primary driver input.

20 Claims, 4 Drawing Sheets

VEHICLE SYSTEMS AND METHODS FOR DYNAMIC DRIVER TUNING

INTRODUCTION

The technical field generally relates to vehicle systems and more particularly relates to enabling a driver to dynamically adjust vehicle response and performance.

Modern vehicles include various enhanced or advanced features to support a human driver operating a vehicle. For example, many vehicles support various automated driver assistance features to improve safety and user experience, such as stability control or traction control systems, lane centering or lane keep assistance, adaptive cruise control, and/or the like. In practice, many vehicles are calibrated to achieve a baseline vehicle response that is most likely to be acceptable to a broad segment of the driving population while achieving other safety and performance objectives. However, the default factory calibration may not comport with some drivers, who may prefer reduced assistance or greater control over vehicle response and performance. For example, some drivers may prefer oversteering or less stability while other drivers may prefer greater stability. Accordingly, it is desirable to enable drivers to tune vehicle response and performance in accordance with their individual preferences in an intuitive manner.

SUMMARY

Apparatus for a vehicle and related methods and vehicle systems are provided. In an exemplary implementation, a method of assisting operation of a vehicle is provided that involves obtaining, by a control module associated with the vehicle, driver input indicative of a driver command to influence a trajectory of the vehicle from a first human-machine interface device coupled to the control module, generating, by the control module, a vehicle state command output based at least in part on the driver input and calibration data associated with the first human-machine interface device, providing, by the control module, the vehicle state command output to an actuator control system associated with the vehicle, wherein the actuator control system is configurable to operate an actuator of the vehicle in accordance with the vehicle state command output to influence the trajectory of the vehicle, obtaining, by the control module, an auxiliary driver input indicative of a second driver command to influence responsiveness of the vehicle to the driver input from a second human-machine interface device different from the first human-machine interface device, and adjusting, by the control module, a relationship between the vehicle state command output and the driver input based on the auxiliary driver input.

In one implementation, adjusting the relationship involves determining an adjusted vehicle state command output corresponding to the driver input, wherein the actuator control system is configurable to operate the actuator of the vehicle in accordance with the adjusted vehicle state command output to influence the trajectory of the vehicle in a manner that is different from the vehicle state command output. In another implementation, the method involves adjusting the calibration data associated with the first human-machine interface device in response to the auxiliary driver input, resulting in adjusted calibration data associated with the first human-machine interface device, wherein adjusting the relationship involves generating an adjusted vehicle state command output based at least in part on the driver input and the adjusted calibration data associated with the first human-machine interface device. In a further implementation, adjusting the calibration data involves adjusting one or more calibration parameters associated with the first human-machine interface device to provide an underdamped response to actuation of the first human-machine interface device when the auxiliary driver input is indicative of a driver intent to increase responsiveness of the trajectory of the vehicle to the actuation of the first human-machine interface device. In another implementation, adjusting the calibration data involves adjusting one or more calibration parameters associated with the first human-machine interface device to provide an overdamped response to actuation of the first human-machine interface device when the auxiliary driver input is indicative of a driver intent to decrease responsiveness of the trajectory of the vehicle to the actuation of the first human-machine interface device. In another implementation, adjusting the calibration data involves adjusting one or more calibration parameters associated with the first human-machine interface device proportional to actuation of the second human-machine interface device. In a further implementation, the method involves obtaining measurement data indicative of the actuation of the second human-machine interface device from a sensor device coupled between the second human-machine interface device and the control module, wherein adjusting the one or more calibration parameters involves adjusting the one or more calibration parameters associated with the first human-machine interface device based at least in part on the measurement data.

An apparatus for a non-transitory computer-readable medium is also provided. The non-transitory computer-readable medium has stored or encoded thereon executable instructions that, when executed by a processor, cause the processor to provide a dynamic tuning service configurable to obtain driver input indicative of a driver command to influence a trajectory of a vehicle from a first human-machine interface device, generate a vehicle state command output based at least in part on the driver input and calibration data associated with the first human-machine interface device, provide the vehicle state command output to an actuator control system associated with the vehicle, wherein the actuator control system is configurable to operate an actuator of the vehicle in accordance with the vehicle state command output to influence the trajectory of the vehicle, obtain an auxiliary driver input indicative of a second driver command to influence responsiveness of the vehicle to the driver input from a second human-machine interface device different from the first human-machine interface device, and adjust a relationship between the vehicle state command output and the driver input based on the auxiliary driver input. In one implementation, the dynamic tuning service is configurable to determine an adjusted vehicle state command output corresponding to the driver input in response to the auxiliary driver input, wherein the actuator control system is configurable to operate the actuator of the vehicle in accordance with the adjusted vehicle state command output to influence the trajectory of the vehicle in a manner that is different from the vehicle state command output.

In one implementation, the dynamic tuning service is configurable to adjust the calibration data associated with the first human-machine interface device in response to the auxiliary driver input, resulting in adjusted calibration data associated with the first human-machine interface device, wherein adjusting the relationship involves the dynamic tuning service generating an adjusted vehicle state command output based at least in part on the driver input and the adjusted calibration data associated with the first human-machine interface device. In another implementation, the dynamic tuning service is configurable to adjust one or more calibration parameters associated with the first human-machine interface device to provide an underdamped response to actuation of the first human-machine interface device when the auxiliary driver input is indicative of a driver intent to increase responsiveness of the trajectory of the vehicle to the actuation of the first human-machine interface device. In a further implementation, the dynamic tuning service is configurable to adjust one or more calibration parameters associated with the first human-machine interface device to provide an overdamped response to actuation of the first human-machine interface device when the auxiliary driver input is indicative of a driver intent to decrease responsiveness of the trajectory of the vehicle to the actuation of the first human-machine interface device. In one implementation, the dynamic tuning service is configurable to adjust one or more calibration parameters associated with the first human-machine interface device proportional to actuation of the second human-machine interface device. In a further implementation, the dynamic tuning service is configurable to obtain measurement data indicative of the actuation of the second human-machine interface device from a sensor device coupled between the second human-machine interface device and the processor and adjust the one or more calibration parameters associated with the first human-machine interface device based at least in part on the measurement data.

In another implementation, a vehicle system is also provided that includes a primary human-machine interface device for receiving a driver input indicative of a driver command to influence a trajectory of a vehicle, an auxiliary human-machine interface device for receiving an auxiliary driver input indicative of a second driver command to influence responsiveness of the vehicle, an actuation system including one or more actuators operable to control the trajectory of the vehicle and an actuator control system coupled to the one or more actuators to operate the one or more actuators in response to a vehicle state command, a data storage element including calibration data associated with the primary human-machine interface device, and a driver command interpretation module coupled to the primary human-machine interface device, the auxiliary human-machine interface device, the actuation system and the data storage element to provide a dynamic tuning service. The dynamic tuning service is configurable to generate the vehicle state command based at least in part on the driver input and the calibration data associated with the primary human-machine interface device, and in response to the auxiliary driver input, adjust a relationship between the vehicle state command and the driver input based on the auxiliary driver input, resulting in an adjusted vehicle state command for the driver input, wherein the actuator control system operates the one or more actuators in accordance with the adjusted vehicle state command to influence a relationship between the trajectory of the vehicle and the driver input.

In one implementation, the dynamic tuning service is configurable to adjust the calibration data associated with the primary human-machine interface device in response to the auxiliary driver input, resulting in adjusted calibration data associated with the primary human-machine interface device, store the adjusted calibration data associated with the primary human-machine interface device in the data storage element, and determine the adjusted vehicle state command based at least in part on the driver input and the adjusted calibration data associated with the primary human-machine interface device. In a further implementation, the adjusted calibration data includes an adjusted value for a calibration parameter associated with the primary human-machine interface device to provide an underdamped response to actuation of the primary human-machine interface device when the auxiliary driver input is indicative of a driver intent to increase responsiveness of the trajectory of the vehicle to the actuation of the primary human-machine interface device. In another implementation, the adjusted calibration data includes an adjusted value for a calibration parameter associated with the primary human-machine interface device to provide an overdamped response to actuation of the primary human-machine interface device when the auxiliary driver input is indicative of a driver intent to decrease responsiveness of the trajectory of the vehicle to the actuation of the primary human-machine interface device. In one implementation, the dynamic tuning service is configurable to adjust one or more calibration parameters associated with the primary human-machine interface device proportional to actuation of the auxiliary human-machine interface device. In a further implementation, the vehicle system includes a sensor device coupled to the driver command interpretation module to provide measurement data indicative of the actuation of the auxiliary human-machine interface device, wherein the dynamic tuning service is configurable to adjust the one or more calibration parameters associated with the primary human-machine interface device based at least in part on the measurement data.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
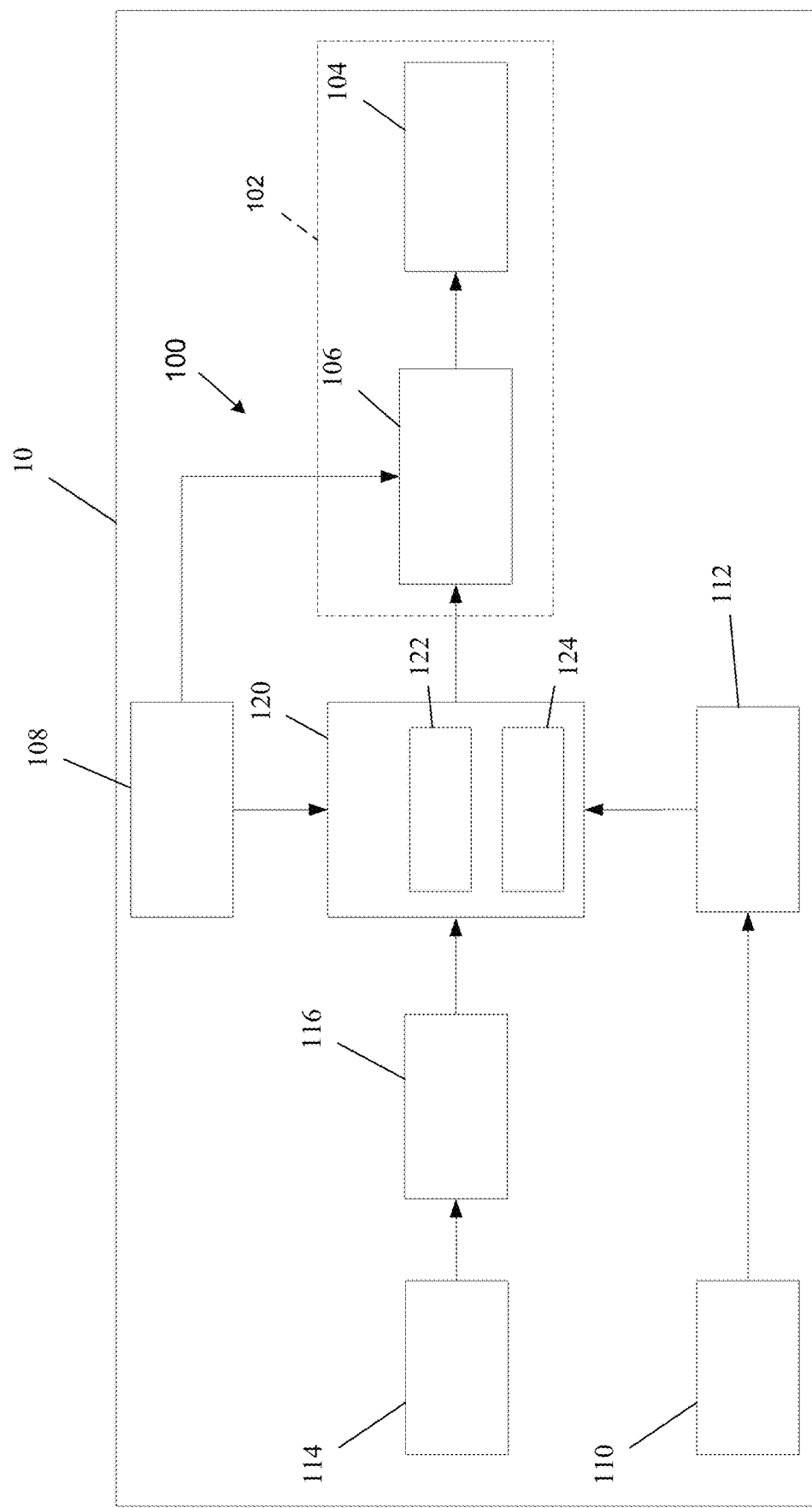
FIG. 1 is a block diagram illustrating a vehicle system including a driver command interpreter configurable to support a dynamic tuning service in accordance with various implementations.

FIG. 1 depicts an exemplary implementation of a vehicle system 100 that is configurable to enable a driver to dynamically adjust the performance and response of a vehicle 10. Depending on the implementation, the vehicle 10 may be realized as any sort of passenger car, sport utility vehicle (SUV), truck, motorcycle, recreational vehicle (RV), marine vessel, aircraft, etc. That said, for purposes of explanation, the subject matter is described herein primarily in the context of an automotive vehicle, which generally includes a chassis, a body, and front and rear wheels rotationally coupled to the chassis near a respective corner of the body, where the body is arranged on the chassis and substantially encloses components of the vehicle 10, and the body and the chassis may jointly form a frame, as will be appreciated in the art.

In exemplary implementations, the vehicle 10 generally includes any number of different actuation systems 102 capable of influencing movement of the vehicle 10 along a trajectory, including, but not limited to, a propulsion system, a transmission system, a steering system, a brake system and/or other traditional actuator systems. Additionally, some implementations of the vehicle 10 may include secondary or auxiliary actuator systems, such as, for example, an active aerodynamics system, a limited slip differential system, an all-wheel drive system, a torque vectoring system, a differential braking system, an active rear steering system, an active (or semi-active) damping system, an active roll system, and/or the like. In an automotive context, the actuation systems 102 are operable to control or otherwise influence the linear accelerations of the vehicle 10 longitudinally and laterally along with the roll, pitch and yaw of the vehicle 10. It should be appreciated that the subject matter described herein is not limited to any particular type, number or configuration of actuation systems 102 that may be present in a practical implementation of the vehicle 10.

In exemplary implementations, the respective actuation systems 102 include one or more actuators 104 that are operable to influence the linear and/or angular acceleration of the vehicle 10 under control of an actuator control system 106 associated with the respective actuation system 102. In this regard, the actuator control system 106 generally represents the processing system and associated computer-readable storage device or media that is cooperatively configurable to translate or otherwise convert a received vehicle state command into corresponding actuator commands or signals to be applied to the actuator(s) 104 to operate the actuator(s) 104 to effectuate the commanded vehicle state. The processing system associated with the actuator control system 106 may be implemented or realized using any sort of controller, control module or other processor, and may include any sort of custom made or commercially available processor, a central processing unit (CPU), a graphics processing unit (GPU), a semiconductor-based microprocessor (in the form of a microchip or chip set), a macroprocessor, a system on a chip, any combination thereof, or generally any device for executing instructions. The computer-readable storage device or media may include volatile and nonvolatile storage in read-only memory (ROM), random-access memory (RAM), and keep-alive memory (KAM), for example. KAM is a persistent or non-volatile memory that may be used to store various operating variables, data or other information while the processor of the actuator control system 106 is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination of memory devices capable of storing data, some of which represent executable instructions, used by the actuator control system 106 in controlling the actuator(s) 106, and thereby, the trajectory of the vehicle 10.

The vehicle 10 also includes one or more sensor systems 108 to provide sensed measurement data indicative of one or more characteristics of the vehicle 10 or the surrounding environment. In exemplary implementations, the sensor systems 108 include an inertial measurement system (or inertial measurement unit) that includes one or more accelerometers, gyroscopes (or gyrometers), magnetometers and/or other sensing devices capable of providing sensed measurement data indicative of the linear and angular accelerations of the vehicle 10. The sensed inertial measurement data provided by an inertial measurement sensor system 108 may be input or otherwise provided to one or more actuator control systems 106 to facilitate operation of the actuator(s) 104 in a manner that is influenced by the sensed inertial measurement data for the vehicle 10 (e.g., closed-loop control). Additional sensors systems 108 may include one or more sensing devices that sense other observable conditions of the exterior environment and/or the interior environment of the vehicle 10, including, but are not limited to, radars, lidars, global positioning systems, optical cameras, thermal cameras, ultrasonic sensors, and/or other sensors.

Exemplary implementations of the vehicle 10 include one or more primary human-machine interface (HMI) devices 110 that are actuatable or manipulable by a driver to receive input from the driver that is indicative of a command, intent or desire by the driver to influence a trajectory of the vehicle 10. Examples of primary HMI devices 110 include, but are not limited to, a steering wheel, an accelerator pedal, a brake pedal, a lever, a paddle shifter, and/or the like. In exemplary implementations, the HMI devices 110 are coupled to a driver command interpretation (or driver command interpreter or DCI) module 120 that generally represents the combination of software, hardware and/or firmware that is configurable to convert actuation of a respective HMI 110 into a corresponding command for altering the state of the vehicle 10 in a manner corresponding to the actuation of the HMI device 110 to influence a trajectory of the vehicle 10. In this regard, in some implementations, a respective primary HMI device 110 may be coupled to the DCI module 120 via a corresponding sensor 112 to provide measurement data indicative of the actuation of the primary HMI device 110, where the DCI module 120 converts the HMI actuation measurement data into a corresponding vehicle state command responsive to actuation of the primary HMI device 110. For example, when the HMI device 110 is realized as a steering wheel, the DCI module 120 may be coupled to the steering wheel via a position sensor that provides measurement data indicative of an angular position of the steering wheel (or steering wheel angle), where the DCI module 120 utilizes the steering wheel angle measurement data from the sensor 112 to convert actuation of the steering wheel into a corresponding yaw rate command for the vehicle 10 to influence a lateral trajectory of the vehicle 10. It should be appreciated that the subject matter described herein is not limited to any particular type, number, combination or configuration of primary HMI devices 110 and/or primary HMI sensors 112 that may be present in a practical implementation of the vehicle 10.

In exemplary implementations, the DCI module 120 is implemented or realized using any sort of controller, control module or other processor, and may include any sort of custom made or commercially available processor, a central processing unit (CPU), a graphics processing unit (GPU), a semiconductor-based microprocessor (in the form of a microchip or chip set), a macroprocessor, a system on a chip, any combination thereof, or generally any device for executing instructions. The DCI module 120 includes or otherwise accesses a data storage element (or memory), which may be realized as any sort of non-transitory short or long term storage media capable of storing programming instructions for execution by the processing system associated with the DCI module 120, which may include volatile and nonvolatile storage in ROM, RAM, KAM, PROM, EPROM, EEPROM, flash memory, or any other electric, magnetic, optical, or combination of memory devices capable of storing data, including, but not limited, to calibration data 122 for translating, mapping or otherwise converting actuation of a respective primary HMI device 110 into a corresponding vehicle state command, as described in greater detail below.

Still referring to FIG. 1, in exemplary implementations, the code or other computer-executable programming instructions maintained or accessed by the DCI module 120, when read and executed by the processing system associated with the DCI module 120, cause the DCI module 120 to execute, implement or otherwise support a dynamic tuning service 124 and perform additional tasks, operations, functions, and/or processes described herein. As described in greater detail below, the dynamic tuning service 124 is configurable to enable a driver or other user to influence the manner in which the DCI module 120 translates or converts actuation of a primary HMI device 110 to a corresponding vehicle state command by actuating or manipulating an auxiliary HMI device 114, resulting in an adjusted vehicle state command for the same actuation of the primary HMI device 110. In this regard, the dynamic tuning service 124 enables a driver to influence the relationship between the driver input actuation of the primary HMI device 110 and the resulting vehicle state command for operating the actuation system(s) 102 to influence the trajectory of the vehicle 10 in a manner that deviates from the initial or original calibration data 122 for the vehicle 10.

The auxiliary HMI device(s) 114 are actuatable or manipulable by a driver to receive an auxiliary input from the driver that is indicative of a desire by the driver to influence the response or performance of the vehicle 10 to actuation of a primary HMI device 110 by influencing the relationship between the driver input received via the primary HMI device 110 and the resulting vehicle state command provided to the actuation system(s) 102. Examples of auxiliary HMI devices 114 include, but are not limited to, momentary switches, twist grips, paddle shifters or levers, trigger switches, and/or the like. In this regard, in some implementations, the auxiliary HMI devices 114 may be arranged or configured to be able to be actuated by the driver concurrent to actuation of a primary HMI device 110. For example, the auxiliary HMI device 114 may be realized as a paddle shifter or lever that is mounted, affixed or otherwise associated with a steering wheel functioning as the primary HMI device 110, where actuation of the auxiliary HMI device 114 while actuating the steering wheel causes the dynamic tuning service 124 to adjust the relationship between the yaw rate command output by the DCI module 120 for the input amount of actuation of the steering wheel to increase and/or decrease the commanded yaw rate for a particular steering wheel angle. It should be appreciated that the subject matter described herein is not limited to any particular type, number, combination or configuration of auxiliary HMI devices 114 that may be present in a practical implementation of the vehicle 10.

In the illustrated implementation, a respective auxiliary HMI device 114 is coupled to the DCI module 120 via a corresponding sensor 116 to provide measurement data that quantifies the actuation of the auxiliary HMI device 114, where the dynamic tuning service 124 adjusts the relationship between the vehicle state command output and the primary driver input in a manner that correlates to the actuation of the auxiliary HMI device 114. For example, the auxiliary HMI sensor 116 may be realized as a force sensor or other sensing device capable of providing measurement data indicative of the amount of force applied to the auxiliary HMI device 114, where the dynamic tuning service 124 scales or adjusts the relationship between the vehicle state command output and the primary driver input in a manner that is proportional to the amount of force applied to the auxiliary HMI device 114. Thus, when a driver actuates an auxiliary HMI device 114 to increase the amount of oversteer in response to actuation of the steering wheel, the dynamic tuning service 124 may increase the ratio or relationship between the output commanded yaw rate and the input steering wheel angle in a manner that is proportional to or otherwise correlative to the measured amount of force applied to the auxiliary HMI device 114 output by the auxiliary HMI sensor 116. It should be appreciated that the subject matter described herein is not limited to any particular type of auxiliary HMI sensor 116 or any particular scheme for adjusting the vehicle state command in response to the measurement data output by the auxiliary HMI sensor 116.

Figure 2:
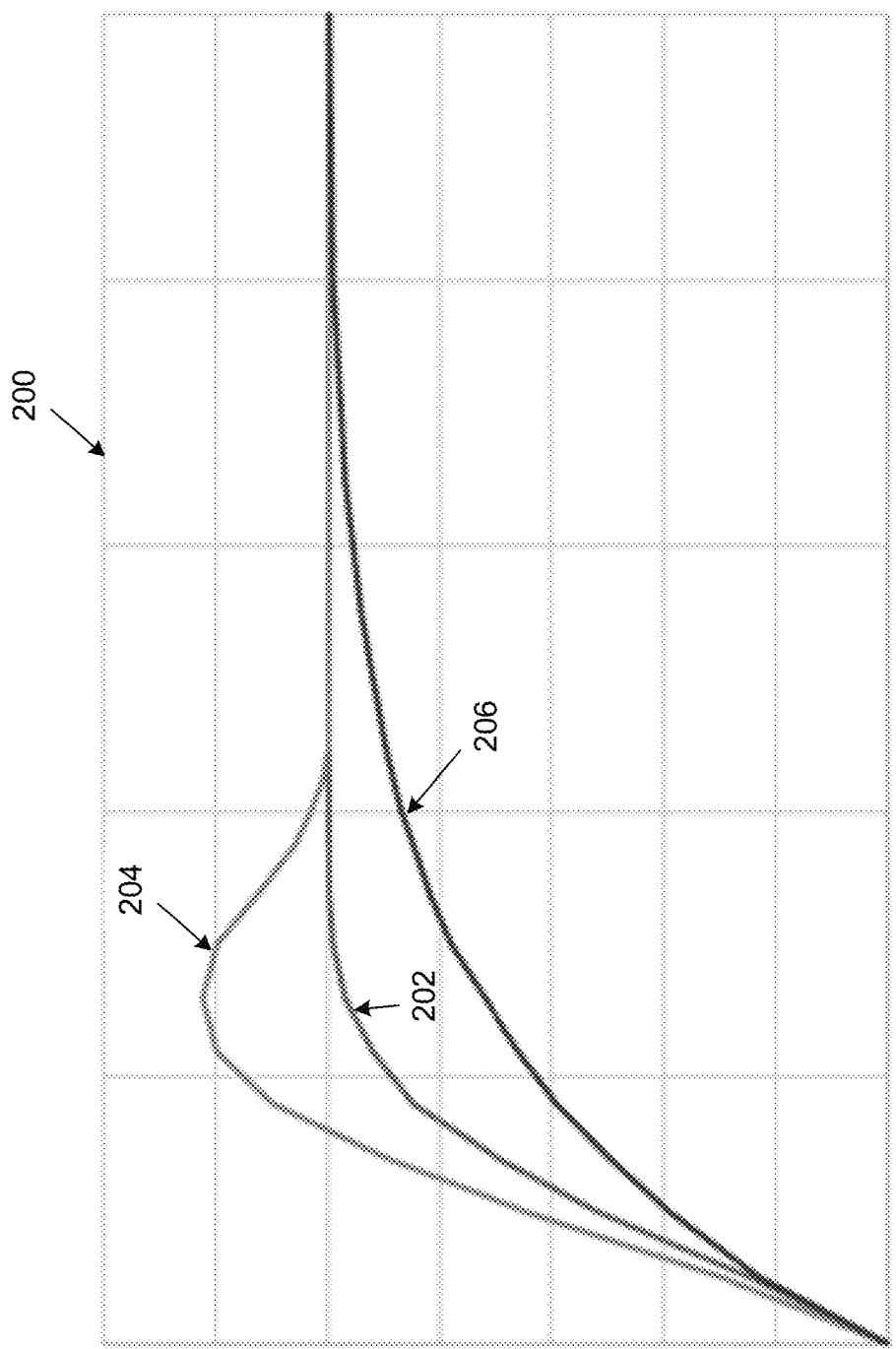
FIG. 2 is a graph depicting different potential vehicle state command outputs in response to actuation of a primary human-machine interface (HMI) device associated with a trajectory of the vehicle for implementation by the dynamic tuning service in the vehicle system of FIG. 1 in accordance with various implementations.

FIG. 2 depicts an exemplary graph 200 of different vehicle state command outputs 202, 204, 206 with respect to time in response to the same amount of actuation of a primary HMI device 110 corresponding to different states of actuation of an auxiliary HMI device 114 concurrent to actuation of the primary HMI device 110. The graph 200 includes a nominal vehicle state command output 202 using the initial or original calibration data 122 for translating the driver input actuation of the respective primary HMI device 110 into the vehicle state command output 202. In this regard, the original calibration data 122 may include pre-calibrated default values for the damping factor, natural frequency, magnitude, gain or other scaling factors, and potentially other parameters or variables that influence the relationship between the nominal vehicle state command output 202 generated by the DCI module 120 and the driver input actuation of the respective primary HMI device 110 with respect to time.

The graph 200 includes a first adjusted vehicle state command output 204 that may be generated by the dynamic tuning service 124 in response to the driver concurrently actuating the auxiliary HMI device 114 to increase the responsiveness of the vehicle 10 (or decrease the stability of the vehicle 10) while providing the driver input actuation of the respective primary HMI device 110. For example, the driver may actuate an auxiliary HMI device 114 associated with a steering wheel primary HMI device 110 to increase the amount or probability of oversteer of the vehicle 10 for the same steering wheel angle applied by the driver. In response to actuation of the auxiliary HMI device 114, the dynamic tuning service 124 may scale or otherwise adjust the values for one or more of the damping factor, natural frequency, magnitude, gain and potentially other parameters or variables that influence the relationship between the yaw rate command output generated by the DCI module 120 in response to the driver input steering wheel angle with respect to time to increase responsiveness, resulting in an underdamped yaw rate command output (e.g., underdamped vehicle state command output 204). For example, the dynamic tuning service 124 may scale, multiply or otherwise adjust the precalibrated original value for the damping factor for the yaw rate command output resulting from driver input actuation of the steering wheel by a gain or other scaling factor that is proportional to the force applied or otherwise correlative to the amount of actuation of the auxiliary HMI device 114 to arrive at an adjusted damping factor value that results in the underdamped vehicle state command output 204.

The graph 200 also includes a second adjusted vehicle state command output 206 that may be generated by the dynamic tuning service 124 in response to the driver concurrently actuating the auxiliary HMI device 114 to decrease the responsiveness of the vehicle 10 (or increase the stability of the vehicle 10) while providing the driver input actuation of the respective primary HMI device 110. For example, the driver may actuate an auxiliary HMI device 114 associated with a steering wheel primary HMI device 110 to increase the amount or probability of understeer of the vehicle 10 for the same steering wheel angle applied by the driver. In response to actuation of the auxiliary HMI device 114 to decrease responsiveness, the dynamic tuning service 124 may similarly scale or otherwise adjust the values for the damping factor to decrease responsiveness of the yaw rate command output generated by the DCI module 120 responsive to the driver input steering wheel angle with respect to time by adjusting the precalibrated or nominal value for the damping factor for the yaw rate command to arrive at an adjusted damping factor value that results in the overdamped vehicle state command output 206.

Referring to FIG. 2 with continued reference to FIG. 1, the dynamic tuning service 124 enables a driver to dynamically increase or decrease the responsiveness of the actuation systems 102 to actuation of the primary HMI devices 110 substantially in real-time by using the auxiliary HMI devices 114 to dynamically adjust the calibration factors used by the DCI module 120 when translating actuation of the primary HMI devices 110 into corresponding vehicle state commands for operating the actuation systems 102. In some implementations, the dynamic tuning service 124 may be configurable to dynamically adjust the calibration data 122 associated with the DCI module 120 to personalize the vehicle response, for example, by overwriting the original precalibrated values for different tuning parameters or variables with adjusted values resulting from actuation of the auxiliary HMI devices 114 to adapt the response and performance of the vehicle 10 to the individual driver's preferences. For example, after actuating the auxiliary HMI device 114 to cause the dynamic tuning service 124 of the DCI module 120 to increase responsiveness by generating an underdamped vehicle command state output 204 in response to actuation of a primary HMI device 110, the dynamic tuning service 124 may store or otherwise maintain the adjusted damping factor value and/or other adjusted values for the tuning parameters associated with actuation of the primary HMI device 110 for use in lieu of the originally calibrated values for those tuning parameters associated with actuation of the primary HMI device 110. In this regard, the dynamic tuning service 124 may define or otherwise create different driver profiles within the calibration data 122, with each driver profile being associated with a different set of tuning parameters different from the original set of precalibrated tuning parameters. In such implementations, when the vehicle 10 is keyed on or otherwise started up by a driver, the dynamic tuning service 124 may be configured to generate or otherwise provide a graphical user interface (GUI) display on an infotainment system or other display device associated with the vehicle 10 that allows the driver to select or otherwise identify whether the driver would like to utilize the original set of calibrated values for the vehicle tuning parameters or an adjusted set of values for the vehicle tuning parameters associated with a different driving profile.

In some implementations, the dynamic tuning service 124 may utilize machine learning or other artificial intelligence techniques to automatically generate one or more different driver profiles of adjusted vehicle tuning parameters based on relationships between prior actuation of the auxiliary HMI devices 114, prior actuation of the primary HMI devices 110 and/or other contextual data or information associated with the prior action of the HMI devices 110, 114. For example, the dynamic tuning service 124 may receive contextual data or information from a vehicle navigation system, the vehicle sensor systems 108 and/or other sources that allows the dynamic tuning service 124 to automatically generate or learn a particular driving profile to be utilized for a particular geographic location, a particular navigational route and/or the like.

Figure 3:
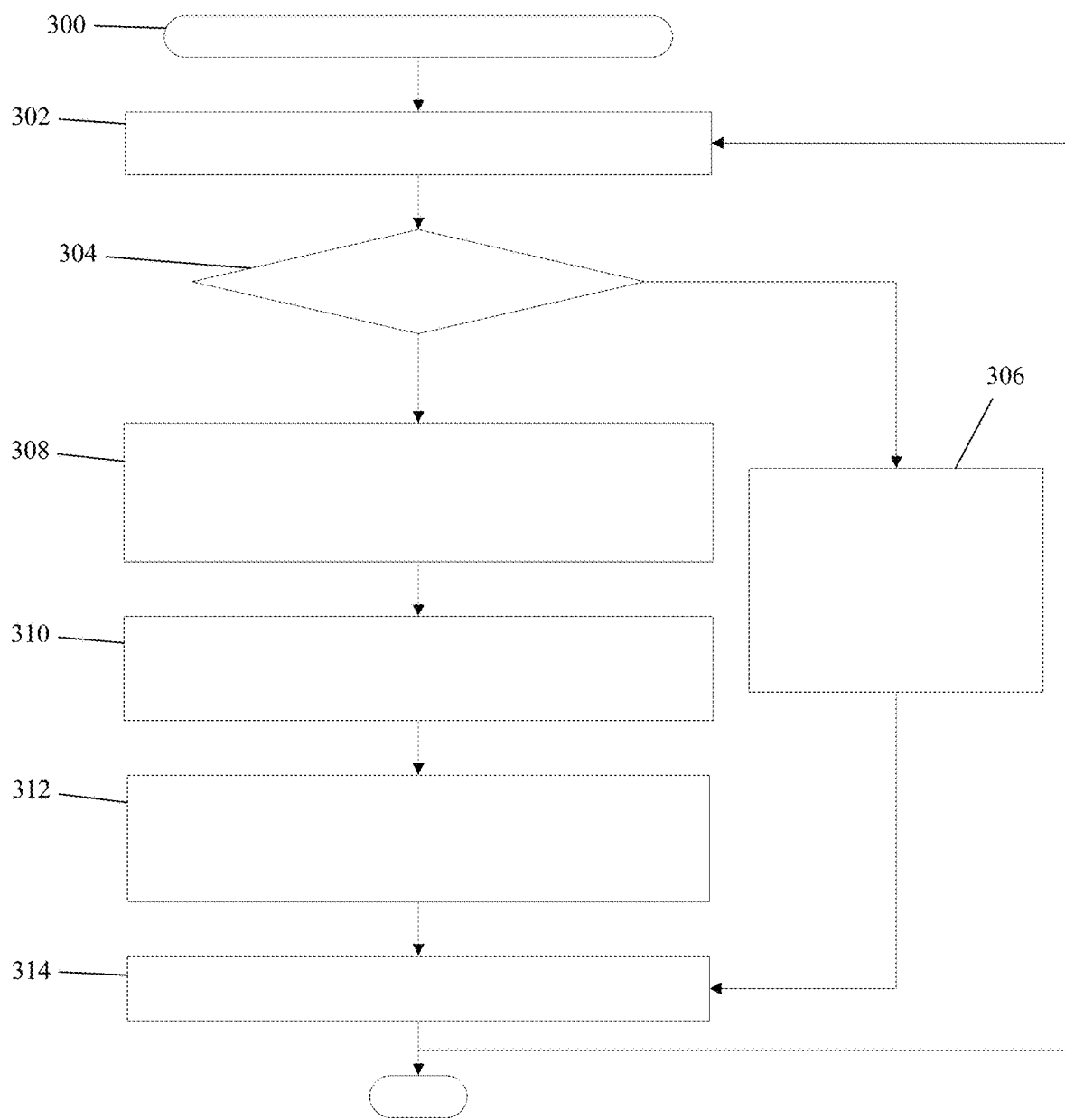
FIG. 3 is a flow diagram illustrating an exemplary personalized tuning process suitable for implementation by the dynamic tuning service in the vehicle system of FIG. 1 according to one or more implementations described herein.

FIG. 3 depicts an exemplary personalized tuning process 300 suitable for implementation by driver command interpreter associated with a vehicle. For illustrative purposes, the following description may refer to elements mentioned above in connection with FIGS. 1-2. While portions of the personalized tuning process 300 may be performed by different elements of a vehicle system, for purposes of explanation, the subject matter may be primarily described herein in the context of the personalized tuning process 300 being primarily performed by the dynamic tuning service 124 at the DCI module 120.

The personalized tuning process 300 initializes or otherwise begins in response to receiving or otherwise obtaining a primary driver input command indicative of a desire to cause movement of the vehicle along a trajectory desired by the driver at 302. In this regard, as described above, the primary driver input command may be realized as any sort of actuation of a steering wheel, accelerator pedal, brake pedal or other primary HMI device 110 that is configured to support translation of actuation or manipulation by a driver into a corresponding change in the inertial state of the vehicle 10. When a primary driver input is received, the personalized tuning process 300 continues at 304 by identifying, detecting or otherwise determining whether an auxiliary driver input is received concurrent to the primary driver input. In this regard, the dynamic tuning service 124 associated with the DCI module 120 may monitor any auxiliary HMI devices 114 associated with the actuated primary HMI device 110 to identify whether an auxiliary driver input is present that indicates an intent or desire by the driver to influence the manner in which the DCI module 120 translates or converts the actuation of the primary HMI device 110 into corresponding changes in the inertial state of the vehicle 10.

In the absence of an auxiliary driver input, the personalized tuning process 300 automatically generates a vehicle state command responsive to the primary driver input using the stored calibration parameters associated with the respective primary HMI device at 306 and automatically provides the resulting vehicle state command to one or more onboard actuation systems at 314 to produce a corresponding change in the inertial state of the vehicle 10 to achieve a lateral and/or longitudinal trajectory desired by the driver. In this regard, prior to receipt of an auxiliary driver input, the dynamic tuning service 124 accesses the stored calibration data 122 to obtain the default or precalibrated values for the damping factor, natural frequency, magnitude and potentially other parameters or variables associated with converting a received driver input from a particular primary HMI device 110 into a corresponding vehicle state command, and then utilizes the obtained calibration parameter values to generate a vehicle state command (e.g., nominal vehicle state command output 202) that reflects the amount and/or rate of actuation of the respective primary HMI device 110.

In one or more exemplary implementations, the DCI module 120 utilizes sensed inertial measurement data and potentially other vehicle state data from onboard sensor systems 108 along with the calibration parameters when generating or otherwise converting the actuation of the respective primary HMI device 110 into a vehicle state command. In this regard, the DCI module 120 may limit or otherwise impose one or more safety and/or stability constraints on the resulting vehicle state command given the current inertial measurement data and other current vehicle state information to ensure the vehicle state command maintains operation of the vehicle 10 within proscribed limits, the details of which are not germane to this disclosure. The vehicle state command generated by the DCI module 120 is provided to one or more actuator control systems 106 to control operation of respective actuation systems 102 associated with the vehicle 10 to actuate the actuators 104 and cause corresponding motion of the vehicle 10 that reflects, and is responsive to, the sensed actuation of the primary HMI device 110 corresponding to the received driver input command.

The loop defined by 302, 304, 306 and 314 may repeat continually throughout operation of the vehicle 10 until an auxiliary driver input is detected, identified or otherwise received at 304. In response to obtaining an auxiliary driver input concurrent to a primary driver input, the personalized tuning process 300 continues by dynamically adjusting one or more calibration parameters associated with the respective primary HMI device at 308 to dynamically adjust or otherwise influence the relationship between actuation of the respective primary HMI device and the resulting vehicle state command. For example, as described above, in response to actuation of an auxiliary HMI device 114 associated with a concurrently actuated primary HMI device 110, the dynamic tuning service 124 may utilize sensed measurement data obtained from an auxiliary HMI sensor 116 to scale or otherwise adjust the default or precalibrated values for one or more of the damping factor, natural frequency, magnitude and potentially other parameters or variables associated with converting a received driver input from that particular primary HMI device 110 into a corresponding vehicle state command in a manner that is commensurate with, proportional to, or otherwise corresponds to the sensed actuation of the auxiliary HMI sensor 116. In this regard, depending on the particular auxiliary HMI device 114 being actuated, the particular direction or manner of actuation of the particular auxiliary HMI device 114, the magnitude of force associated with actuation of the particular auxiliary HMI device 114, and/or other characteristics of the actuation of the particular auxiliary HMI device 114, the dynamic tuning service 124 may increase and/or decrease values for the calibration parameters to correspondingly increase or decrease the responsiveness of the resulting vehicle state command to the actuation of the primary HMI device 110.

For example, when the sensed auxiliary actuation measurement data received from an auxiliary HMI sensor 116 corresponds a driver intent to increase vehicle responsiveness and/or reduce stability with respect to actuation of the primary HMI device 110, the dynamic tuning service 124 may correspondingly determine adjusted values for one or more calibration parameters associated with that actuated primary HMI device 110 to provide a more underdamped or sensitive vehicle state command output responsive to actuation of that primary HMI device 110 (e.g., underdamped vehicle state command output 204). On the other hand, when the sensed auxiliary actuation measurement data received from the auxiliary HMI sensor 116 corresponds a driver intent to decrease vehicle responsiveness and/or increase stability with respect to actuation of the primary HMI device 110, the dynamic tuning service 124 may correspondingly determine adjusted values for one or more calibration parameters associated with that actuated primary HMI device 110 to provide a more overdamped or insensitive vehicle state command output responsive to actuation of that primary HMI device 110 (e.g., overdamped vehicle state command output 206).

Still referring to FIG. 3, with continued reference to FIGS. 1-2, in one or more implementations, the personalized tuning process 300 stores or otherwise maintains the adjusted calibration parameters in association with a particular driving profile at 310. For example, in some implementations, the dynamic tuning service 124 may instantiate or otherwise create a set of calibration data 122 for a temporary driving profile for use during the current instance of operation of the vehicle 10 that includes the adjusted calibration parameter values for at least some of the primary HMI devices 110 that may be utilized in lieu of, or in concert with, the default or original precalibrated parameter values for those or other primary HMI devices 110. In this regard, in some implementations, after the current instance of operation of the vehicle 10 is completed, the dynamic tuning service 124 may generate or otherwise provide a GUI display that allows the driver to save or otherwise persistently maintain the temporary driving profile as a saved driving profile available for re-use (e.g., by assigning a unique name or other identifier to the driving profile and persistently maintaining the adjusted calibration parameter values as part of the calibration data 122 available to the dynamic tuning service 124). In other implementations, the dynamic tuning service 124 may store or otherwise maintain the adjusted calibration parameter values in association with the received primary and auxiliary HMI inputs, and potentially other contextual information (e.g., inertial measurement data, route data or other navigational information, and/or the like) to provide a training data set for utilizing machine learning or artificial intelligence techniques for deriving or developing a personalized set of calibration data that adapts to changes in the driver's behavior over time to be utilized in place of the originally precalibrated calibration parameter values.

After determining adjusted calibration parameter values, the personalized tuning process 300 automatically generates an adjusted vehicle state command responsive to the primary driver input using the adjusted calibration parameters associated with the respective primary HMI device at 312. In this regard, the adjusted calibration parameters influence the manner in which a given primary driver input actuation is mapped, translated or otherwise converted into a vehicle state command, such that the same amount and/or rate of primary driver input actuation results in a different vehicle state command by virtue of the adjusted calibration parameters. In a similar manner as described above, the DCI module 120 utilizes the adjusted calibration parameter values in concert with the sensed vehicle measurement data from the onboard sensor systems 108 to convert the actuation of the respective primary HMI device 110 into an adjusted vehicle state command while maintaining operation of the vehicle 10 within other applicable limits on vehicle operation. The personalized tuning process 300 provides the adjusted vehicle state command to the actuation systems for implementation at 314 in a similar manner as described above.

The loop defined by 302, 304, 308, 310, 312 and 314 may repeat at a rate or frequency associated with the update of the vehicle state command by the DCI module 120 and/or the actuation systems 102 to continually and dynamically adjust the calibration parameters while an auxiliary HMI device 114 is concurrently actuated. In this regard, a driver may maintain constant actuation, or progressively increase or decrease actuation, of an auxiliary HMI device 114 until the vehicle 10 exhibits the desired amount of responsiveness and/or stability, at which point the driver may cease actuation of the auxiliary HMI device 114. Thereafter, the resulting adjusted calibration parameters may be stored or otherwise maintained by the dynamic tuning service 124 of the DCI module 120 (e.g., as part of a temporary driving profile) for subsequent reference and implementation during the current instance of operation of the vehicle 10 in lieu of any original or default precalibrated values for the calibration parameters at 306. Thus, a driver may utilize the auxiliary HMI devices 114 to dynamically tune and adjust aspects of the performance of responsiveness of the vehicle 10 until achieving his or her individually preferred amount of responsiveness. Once the vehicle 10 exhibits the desired responsiveness, the driver may cease actuation of the auxiliary HMI devices 114 for the remainder of the current instance of operation of the vehicle 10. Additionally, in implementations where the resulting driving profile of adjusted calibration parameters is stored or otherwise persisted across instances of operation of the vehicle 10, the driver may select or otherwise enable the desired driving profile to achieve his or her desired responsiveness during subsequent instances of operating the vehicle 10 without having to actuating the auxiliary HMI devices 114.

Figure 4:
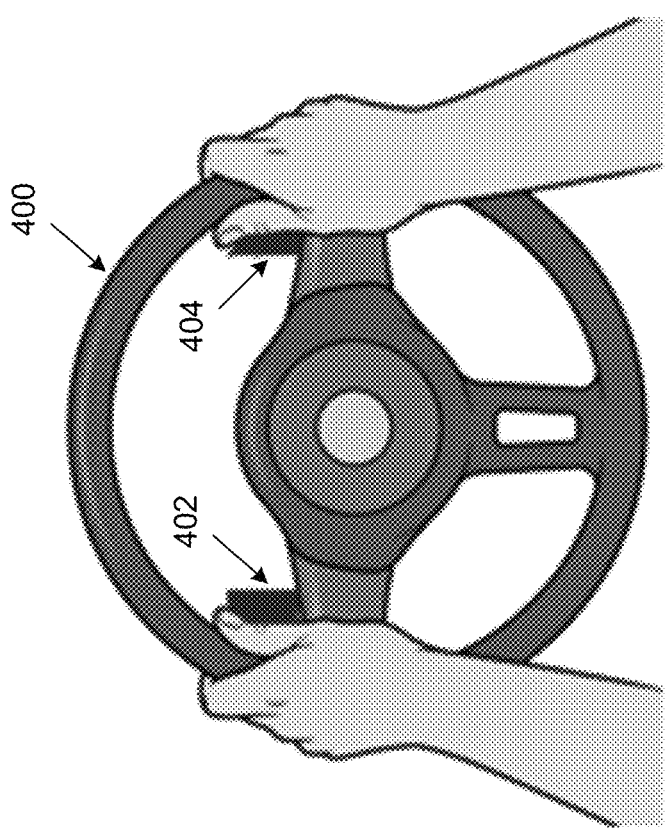
FIG. 4 is a schematic illustrating an exemplary arrangement of a primary HMI device having auxiliary HMI devices integrated therewith that are suitable for use in connection with the personalized tuning process of FIG. 3 and the dynamic tuning service in the vehicle system of FIG. 1 according to one or more implementations described herein.

FIG. 4 depicts an exemplary implementation of a steering wheel 400 suitable for use as a primary HMI device 110 and associated auxiliary HMI devices 402, 404 suitable for use with the personalized tuning process 300 of FIG. 3 and the dynamic tuning service 124 of the DCI module 120 in the vehicle system 100 of FIG. 1. In this regard, the auxiliary HMI devices 402, 404 may be realized as depressible switches or levers that are integrated with the steering wheel 400. During operation of the vehicle 10, a driver may actuate one or both of the auxiliary HMI devices 402, 404 concurrent to actuating the steering wheel 400 in a clockwise or counterclockwise direction to influence the manner in which the vehicle 10 responds to actuation of the steering wheel 400 in that particular direction or manner.

For example, in one implementation, when the driver actuates the first auxiliary HMI device 402 corresponding to the direction of the turn or maneuver being initiated by the driver when the steering wheel 400 is actuated to the left in a counterclockwise direction, the dynamic tuning service 124 may determine that the driver intends to increase the vehicle responsiveness and/or decrease stability in response to the actuation of the steering wheel 400, and correspondingly adjust the calibration parameters associated with actuation of the steering wheel 400 in the left or counterclockwise direction to increase the responsiveness to provide a greater likelihood of oversteer (e.g., by providing an underdamped yaw rate vehicle command output 204 responsive to actuation of the steering wheel 400). In this regard, in some implementations, the dynamic tuning service 124 adjust the calibration parameters associated with actuation of the steering wheel 400 by an amount that corresponds to the amount or rate of actuation of the auxiliary HMI device 402, for example, by increasingly underdamping the response in a manner that is proportional to the force applied to the auxiliary HMI device 402 that is sensed or otherwise measured by an auxiliary HMI sensor 116.

An adjusted underdamped yaw rate command generated by the dynamic tuning service 124 responsive to the concurrent actuation of the steering wheel 400 and the left auxiliary HMI device 402 is provided to the vehicle steering system and/or other actuation systems 102 associated with the vehicle 10 to provide a more underdamped response in the vehicle yaw rate to the actuation of the steering wheel 400. In this regard, the adjusted underdamped yaw rate command may also result in a propulsion system, transmission system or other actuation system 102 increasing and/or decreasing actuation of its associated actuators 104 to cooperate with the steering system to provide the desired amount or rate of change to the vehicle's yaw in response to the adjusted underdamped yaw rate command. In this manner, actuation of the auxiliary HMI device 402 may adjust the relationship between the vehicle yaw rate command and the driver input steering wheel angle to influence the lateral trajectory of the vehicle in a manner that is different from what the lateral trajectory of the vehicle would otherwise be for the same driver input steering wheel angle using the initial or default calibration data 122.

Alternatively, when the driver actuates the second auxiliary HMI device 404 in the opposite direction of the turn or maneuver being initiated by the driver when the steering wheel 400 is actuated to the left in a counterclockwise direction, the dynamic tuning service 124 may determine that the driver intends to decrease the vehicle responsiveness and/or increase stability in response to the actuation of the steering wheel 400, and correspondingly adjust the calibration parameters associated with actuation of the steering wheel 400 in the left or counterclockwise direction to decrease the responsiveness to provide a greater likelihood of understeer (e.g., by providing an overdamped yaw rate vehicle command output 206 responsive to actuation of the steering wheel 400). The adjusted overdamped yaw rate command generated by the dynamic tuning service 124 responsive to the concurrent actuation of the steering wheel 400 and the right auxiliary HMI device 404 is then provided to the vehicle steering system and/or other actuation systems 102 associated with the vehicle 10 to provide a more overdamped response in the vehicle yaw rate to the actuation of the steering wheel 400.

In various implementations, the auxiliary HMI devices 402, 404 may be capable of being utilized to influence the vehicle response to actuation of other primary HMI devices 110 that are different from the steering wheel 400. For example, actuation of one or more of the auxiliary HMI devices 402, 404 when the steering wheel is in a neutral or unactuated state or is otherwise in a steady state condition (e.g., when a rate of change of the steering wheel angle is less than a threshold) may cause the dynamic tuning service 124 to adjust the calibration parameters associated with the longitudinal trajectory of the vehicle 10 or other primary HMI devices 110. For example, concurrent actuation of both auxiliary HMI devices 402, 404 while the steering wheel 400 is in a steady state condition may be configured to cause the dynamic tuning service 124 to adjust the calibration parameters associated with an acceleration pedal, a brake pedal, or other primary HMI device 110 associated with the longitudinal motion of the vehicle 10 to increase the responsiveness of the vehicle 10 to actuation of that respective primary HMI device 110 to influence the longitudinal trajectory of the vehicle 10. In this regard, the adjusted calibration parameters may cause the DCI module 120 to provide an adjusted underdamped longitudinal acceleration rate command to a propulsion system, transmission system or other actuation system 102 in response to actuation of the acceleration pedal and/or an adjusted overdamped deceleration rate command to a braking system in response to actuation of the brake pedal.

It will be appreciated there are numerous different potential types, configurations and combinations of primary and auxiliary HMI devices that may be utilized in connection with the dynamic tuning service 124 and the personalized tuning process 300, and the subject matter described herein is not limited to any particular combination, configuration, algorithm or scheme for adjusting the relationship between the primary driver input command for controlling or influencing the vehicle trajectory and the responsive vehicle state commands provided to the onboard actuation systems 102. For example, in some implementations, a driver or other user may manually configure the amount by which actuation of an auxiliary HMI device adjusts or otherwise influences the resulting vehicle state command (e.g., by preconfiguring a gain or other factor that dictates the relationship between the actuation of an auxiliary HMI device and the resulting vehicle state command adjustment). Moreover, some implementations may enable a driver or other user to manually configure the relationship between the auxiliary HMI devices and actuation systems influenced by actuation of the auxiliary HMI devices. For example, a driver or other user may select which actuation system (or a subset of actuation systems) is adjustable or tunable by a particular auxiliary HMI device to achieve the desired vehicle dynamic response, while in other implementations, any of the actuation systems may be configured to be adjusted by any auxiliary HMI device to allow the entire vehicle system to be adjusted as needed to achieve the desired response.

For sake of brevity, conventional techniques related to vehicle control systems, actuator control systems, vehicle actuation systems, driver command interpretation, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an implementation of the subject matter.

As used herein, the word "exemplary" means "serving as an example, instance, or illustration." Thus, any implementation described herein as "exemplary" is not necessarily to be construed as preferred or advantageous over other implementations. All of the implementations described herein are exemplary implementations provided to enable persons skilled in the art to make or use the invention and not to limit the scope of the invention which is defined by the claims.

Those of skill in the art will appreciate that the various illustrative logical blocks, modules, circuits, and algorithm steps described in connection with the implementations disclosed herein may be implemented as electronic hardware, computer software, or combinations of both. Some of the implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of assisting operation of a vehicle, the method comprising:
   obtaining, by a control module associated with the vehicle, driver input indicative of a driver command to influence a trajectory of the vehicle from a first human-machine interface device coupled to the control module;
   generating, by the control module, a vehicle state command output based at least in part on the driver input and calibration data associated with the first human-machine interface device;
   providing, by the control module, the vehicle state command output to an actuator control system associated with the vehicle;
   operating, by the actuator control system, an actuator of the vehicle in accordance with the vehicle state command output to influence the trajectory of the vehicle;
   obtaining, by the control module, an auxiliary driver input indicative of a second driver command to influence responsiveness of the vehicle to the driver input from a second human-machine interface device different from the first human-machine interface device, wherein the second human-machine interface device is a hand operated human-machine interface device, wherein the driver command and the second driver command are simultaneously input by a driver of the vehicle via the first human-machine interface device and the second human-machine interface device and thereby tuning the responsiveness of the vehicle to a preference of the driver;
   adjusting, by the control module, a relationship between the vehicle state command output and the driver input based on the auxiliary driver input including determining an adjusted vehicle state command output corresponding to the driver input; and
   operating the actuator of the vehicle in accordance with the adjusted vehicle state command output to influence the trajectory of the vehicle in a manner that is different from the vehicle state command output.

2. The method of claim 1, wherein tuning the responsiveness of the vehicle to the preference of the driver comprises both increasing the responsiveness of the vehicle and decreasing the responsiveness of the vehicle to accomplish the preference of the driver in accordance with the second driver command.

3. The method of claim 1, further comprising adjusting the calibration data associated with the first human-machine interface device in response to the auxiliary driver input, resulting in adjusted calibration data associated with the first human-machine interface device, wherein adjusting the relationship comprises generating an adjusted vehicle state command output based at least in part on the driver input and the adjusted calibration data associated with the first human-machine interface device.

4. The method of claim 3, wherein adjusting the calibration data comprises adjusting one or more calibration parameters associated with the first human-machine interface device to provide an underdamped response to actuation of the first human-machine interface device when the auxiliary driver input is indicative of a driver intent to increase responsiveness of the trajectory of the vehicle to the actuation of the first human-machine interface device.

5. The method of claim 3, wherein adjusting the calibration data comprises adjusting one or more calibration parameters associated with the first human-machine interface device to provide an overdamped response to actuation of the first human-machine interface device when the auxiliary driver input is indicative of a driver intent to decrease responsiveness of the trajectory of the vehicle to the actuation of the first human-machine interface device.

6. The method of claim 1, further comprising:
   constructing the hand operated human-machine interface device as a first hand operated switch on a left side of a steering wheel of the vehicle and including a second hand operated switch on a right side of the steering wheel;
   operating the first hand operated switch along with the first human-machine interface device to tune the responsiveness of the vehicle to a first preference of the driver;
   operating the second hand operated switch along with the first human-machine interface device to tune the responsiveness of the vehicle to a second preference of the driver that is different than the first preference; and
   operating both the first hand operated switch and the second hand operated switch simultaneously along with the first human-machine interface device to tune the responsiveness of the vehicle to a third preference of the driver that is different than both the first preference and the second preference.

7. The method of claim 1, further comprising adjusting the calibration data associated with the first human-machine interface device in response to the auxiliary driver input, resulting in adjusted calibration data associated with the first human-machine interface device, wherein adjusting the relationship comprises generating an adjusted vehicle state command output based at least in part on the driver input and the adjusted calibration data associated with the first human-machine interface device, wherein adjusting the calibration data comprises adjusting one or more calibration parameters associated with the first human-machine interface device proportional to actuation of the second human-machine interface device, and further comprising obtaining measurement data indicative of the actuation of the second human-machine interface device from a sensor device coupled between the second human-machine interface device and the control module, wherein adjusting the one or more calibration parameters comprises adjusting the one or more calibration parameters associated with the first human-machine interface device based at least in part on the measurement data.

8. A non-transitory computer-readable medium comprising executable instructions that, when executed by a processor, cause the processor to provide a dynamic tuning service configurable to:
- obtain driver input indicative of a driver command to influence a trajectory of a vehicle from a first human-machine interface device;
- generate a vehicle state command output based at least in part on the driver input and calibration data associated with the first human-machine interface device;
- provide the vehicle state command output to an actuator control system associated with the vehicle, wherein the actuator control system operates an actuator of the vehicle in accordance with the vehicle state command output to influence the trajectory of the vehicle;
- obtain an auxiliary driver input indicative of a second driver command to influence responsiveness of the vehicle to the driver input from a second human-machine interface device different from the first human-machine interface device, wherein the second human-machine interface device is a hand operated human-machine interface device, wherein the driver command and the second driver command are simultaneously input by a driver of the vehicle via the first human-machine interface device and the second human-machine interface device to tune the responsiveness of the vehicle to a preference of the driver;
- adjust a relationship between the vehicle state command output and the driver input based on the auxiliary driver input, including determining an adjusted vehicle state command output corresponding to the driver input; and
- operate the actuator of the vehicle in accordance with the adjusted vehicle state command output to influence the trajectory of the vehicle in a manner that is different from the vehicle state command output.

9. The non-transitory computer-readable medium of claim 8, wherein the dynamic tuning service is configurable to determine an adjusted vehicle state command output corresponding to the driver input in response to the auxiliary driver input, wherein the actuator control system is configurable to operate the actuator of the vehicle in accordance with the adjusted vehicle state command output to influence the trajectory of the vehicle in a manner that is different from the vehicle state command output.

10. The non-transitory computer-readable medium of claim 8, wherein the dynamic tuning service is configurable to adjust the calibration data associated with the first human-machine interface device in response to the auxiliary driver input, resulting in adjusted calibration data associated with the first human-machine interface device, wherein adjusting the relationship comprises the dynamic tuning service generating an adjusted vehicle state command output based at least in part on the driver input and the adjusted calibration data associated with the first human-machine interface device.

11. The non-transitory computer-readable medium of claim 10, wherein the dynamic tuning service is configurable to adjust one or more calibration parameters associated with the first human-machine interface device to provide an underdamped response to actuation of the first human-machine interface device when the auxiliary driver input is indicative of a driver intent to increase responsiveness of the trajectory of the vehicle to the actuation of the first human-machine interface device.

12. The non-transitory computer-readable medium of claim 10, wherein the dynamic tuning service is configurable to adjust one or more calibration parameters associated with the first human-machine interface device to provide an overdamped response to actuation of the first human-machine interface device when the auxiliary driver input is indicative of a driver intent to decrease responsiveness of the trajectory of the vehicle to the actuation of the first human-machine interface device.

13. The non-transitory computer-readable medium of claim 8, wherein the hand operated human-machine interface device includes a first hand operated switch on a left side of a steering wheel of the vehicle and including a second hand operated switch on a right side of the steering wheel, and wherein the dynamic tuning service is configurable to:
- tune, in response to operation of the first hand operated switch along with the first human-machine interface device, the responsiveness of the vehicle to a first preference of the driver;
- tune, in response to operation of the second hand operated switch along with the first human-machine interface device to tune the responsiveness of the vehicle to a second preference of the driver that is different than the first preference; and
- tune, in response to operation of both the first hand operated switch and the second hand operated switch simultaneously along with the first human-machine interface device, the responsiveness of the vehicle to a third preference of the driver that is different than both the first preference and the second preference.

14. The non-transitory computer-readable medium of claim 13, wherein the dynamic tuning service is configurable to obtain measurement data indicative of the actuation of the second human-machine interface device from a sensor device coupled between the second human-machine interface device and the processor and adjust the one or more calibration parameters associated with the first human-machine interface device based at least in part on the measurement data.

15. A vehicle system including:
- a primary human-machine interface device for receiving a driver input indicative of a driver command to influence a trajectory of a vehicle;
- an auxiliary human-machine interface device for receiving an auxiliary driver input indicative of a second driver command to influence responsiveness of the vehicle, wherein the auxiliary human-machine interface device is a hand operated human-machine interface device, wherein the driver command and the second driver command are simultaneously input by a driver of the vehicle via the primary human-machine interface device and the auxiliary human-machine interface device to tune the responsiveness of the vehicle to a preference of the driver;
- an actuation system comprising one or more actuators operable to control the trajectory of the vehicle and an actuator control system coupled to the one or more actuators, wherein the actuation system operates the one or more actuators in response to a vehicle state command;
- a data storage element comprising calibration data associated with the primary human-machine interface device; and
- a driver command interpretation module coupled to the primary human-machine interface device, the auxiliary human-machine interface device, the actuation system and the data storage element to provide a dynamic tuning service configurable to:

generate the vehicle state command based at least in part on the driver input and the calibration data associated with the primary human-machine interface device; and in response to the auxiliary driver input, adjust a relationship between the vehicle state command and the driver input based on the auxiliary driver input, resulting in an adjusted vehicle state command for the driver input, wherein the actuator control system operates the one or more actuators in accordance with the adjusted vehicle state command to influence a relationship between the trajectory of the vehicle and the driver input; and operate the one or more actuators of the vehicle in accordance with the adjusted vehicle state command to influence the trajectory of the vehicle in a manner that is different from the vehicle state command.

16. The vehicle system of claim 15, wherein the dynamic tuning service is configurable to:

adjust the calibration data associated with the primary human-machine interface device in response to the auxiliary driver input, resulting in adjusted calibration data associated with the primary human-machine interface device;

store the adjusted calibration data associated with the primary human-machine interface device in the data storage element; and determine the adjusted vehicle state command based at least in part on the driver input and the adjusted calibration data associated with the primary human-machine interface device.

17. The vehicle system of claim 16, wherein the adjusted calibration data comprises an adjusted value for a calibration parameter associated with the primary human-machine interface device to provide an underdamped response to actuation of the primary human-machine interface device when the auxiliary driver input is indicative of a driver intent to increase responsiveness of the trajectory of the vehicle to the actuation of the primary human-machine interface device.

18. The vehicle system of claim 16, wherein the adjusted calibration data comprises an adjusted value for a calibration parameter associated with the primary human-machine interface device to provide an overdamped response to actuation of the primary human-machine interface device when the auxiliary driver input is indicative of a driver intent to decrease responsiveness of the trajectory of the vehicle to the actuation of the primary human-machine interface device.

19. The vehicle system of claim 15, further comprising:

a steering wheel of the vehicle;

a right switch at the steering wheel; and a left switch at the steering wheel, wherein the right switch and the left switch together comprise the auxiliary human-machine interface device, wherein the driver command interpretation module is configured to:

operate, when the steering wheel is turned in a direction corresponding to one of the right switch and the left switch and the one of the right switch and the left switch is also operated, the one or more actuators to increase turn-in response of the vehicle;

operate, when the steering wheel is turned in a direction corresponding to one of the right switch and the left switch and the other one of the right switch and the left switch is also operated, the one or more actuators to increase stability of the vehicle; and operate, when the steering wheel is turned in a direction corresponding to one of the right switch and the left switch and both of the right switch and the left switch are also operated, the one or more actuators to deliver maximum available torque to the vehicle.

20. The vehicle system of claim 19, further comprising a sensor device coupled to the driver command interpretation module to provide measurement data indicative of the actuation of the auxiliary human-machine interface device, wherein the dynamic tuning service is configurable to adjust the one or more calibration parameters associated with the primary human-machine interface device based at least in part on the measurement data.

* * * * *